US012633225B2

(12) United States Patent　　　　　(10) Patent No.:　　US 12,633,225 B2

OHop, Jr.　　　　　　　　　　　　　　(45) Date of Patent:　　　May 19, 2026

---

(54) SENSORY LEARNING, SENSORY PLAY PEGBOARD DISPLAY AND METHODS OF MAKING AND USING SAME

(71) Applicant: Thomas M. OHop, Jr., South Abington, PA (US)

(72) Inventor: Thomas M. OHop, Jr., South Abington, PA (US)

( * ) Notice: Subject to any disclaimer, the term of this patent is extended or adjusted under 35 U.S.C. 154(b) by 292 days.

(21) Appl. No.: 18/586,470

(22) Filed: Feb. 24, 2024

(65) Prior Publication Data

US 2024/0296747 A1　　Sep. 5, 2024

Related U.S. Application Data

(60) Provisional application No. 63/487,663, filed on Mar. 1, 2023.

(51) Int. Cl.
G09B 1/10　　　　(2006.01)
G09B 5/02　　　　(2006.01)

(52) U.S. Cl.
CPC　G09B 1/10 (2013.01); G09B 5/02 (2013.01)

(58) Field of Classification Search
CPC .................................. G09B 1/10; G09B 5/02
See application file for complete search history.

(56) References Cited

U.S. PATENT DOCUMENTS

| | | | | |
|---|---|---|---|---|
| 2,852,863 | A * | 9/1958 | Homan | A63F 3/0423 |
| | | | | 273/272 |
| 4,188,734 | A * | 2/1980 | Rich | A63F 3/0423 |
| | | | | 434/200 |

| | | | | |
|---|---|---|---|---|
| 6,238,261 | B1 * | 5/2001 | Lang | A63H 33/22 |
| | | | | 446/485 |
| 10,565,899 | B1 * | 2/2020 | Dignam | G09B 23/16 |
| 11,103,068 | B1 * | 8/2021 | Koeppel | A47B 97/001 |
| 2021/0233421 | A1 * | 7/2021 | Lee | A63H 33/042 |

OTHER PUBLICATIONS

Top Therapies for Children With Autism Spectrum Disorder (ASD), https://www.childrens.com/health-wellness/top-therapies-for-children-with-autism-spectrum-disorder.
Treating Autism in Children, https://psychcentral.com/autism/treatment-of-autism-in-children.

* cited by examiner

*Primary Examiner* — Eddy Saint-Vil
(74) *Attorney, Agent, or Firm* — James R. McDaniel; Lawrence P. Zale; Zale Patent Law, Inc.

(57)　　　　　　　　ABSTRACT

The present invention is generally related to a sensory learning, sensory play pegboard display, including a plurality of frame members, a plurality of connectors, wherein each of the plurality of connectors is used to connect each of the plurality of frame members together in order to form a frame assembly, a plurality of frame walls, wherein each of the plurality of frame walls is operatively connected to one of the plurality of frame members, a peg opening plate located adjacent to the frame assembly, wherein the peg opening plate includes a plurality of openings, a plurality of pegs, wherein each of the plurality of pegs is capable of being retained within one of the plurality of openings, a light assembly operatively connected to the plurality of walls and located adjacent to the peg opening plate, and a display backing assembly removably connected to the plurality of walls.

20 Claims, 12 Drawing Sheets

1

SENSORY LEARNING, SENSORY PLAY PEGBOARD DISPLAY AND METHODS OF MAKING AND USING SAME

CROSS-REFERENCE TO RELATED APPLICATION

This application claims the benefit of U.S. Patent Application No. 63/487,663, filed on Mar. 1, 2023, the disclosure of which is hereby incorporated by reference in its entirety to provide continuity of disclosure to the extent such a disclosure is not inconsistent with the disclosure herein.

FIELD OF THE INVENTION

The present invention relates to a sensory learning, sensory play pegboard display (or an electronic, visual presentation device having a pegboard display). In particular, the display is illuminated internally by a long-lasting light emitting diode (LED) light source. Interchangeable, transparent pegs made of different colors are used to create different designs on the display. Preferably, the pegs are constructed of any suitable polymeric material. Finally, the display includes a collapsible base for ease of shipping.

The display is useful for sensory learning applications. In particular, the display can also be used in the treatment of sensory processing disorder (SPD), attention-deficit/hyperactivity disorder (ADHD), dyslexia, autism, and patients suffering from brain damage or memory loss because the display can assist in developing fine gross motor skills, eye coordination, memory retention therapy, and/or cognitive hand dexterity.

BACKGROUND OF THE INVENTION

There are many children who suffer from learning disorders, dyslexia, cognitive dysfunction, attention-deficit/hyperactivity disorder (ADHD), cognitive dexterity disorder (CDD), autism, anxiety, behavioral disorders, cognitive processing functions, and/or other issues and disorders. Every school and home can assist in the treatment of these disorders by having a sensory play device. Teachers, therapists, psychologists, occupational therapists, and parents are always looking for great sensory learning/play devices and are currently limited to sources such as Plato® and Crayola® crayons with no 'wow' factor and which do not adequately promote creativity or a sense of calming.

Also, elderly individuals and individuals who are deaf, hard of hearing, autistic, and/or other individuals suffering from memory loss, such as dementia and Alzheimer's, have utilized "dark sensory rooms" to help develop the senses they have, such as touch and sight for the deaf and memory retention, hand-eye coordination, and cognitive hand dexterity therapy for geriatrics, Alzheimer's, and dementia patients. These sensory rooms help develop these skills using sensory stimulation, fine gross motor skills, hand dexterity, cognitive functions, and thinking. Unfortunately, a sensory room cost at least $3,000.00 and prices can go as high as $30,000 for highly sophisticated sensory therapy treatment. Furthermore, most patients cannot afford such sensory rooms so most patients have to rely on medical insurance in order to have access to sessions in these rooms for their effective therapeutic use.

It is also known that every time a child engages in sensory play, the child's corresponding nerve connections grow a bit stronger, which helps the child's brain develop its sensory processing capabilities. This is because sensory play devices provide a beneficial role in emotional development by allowing the child to engage in sensory experiences, which will distract and calm a child who is feeling overstimulated or anxious by promoting self-discovery and allowing the child to explore new textures while being creative.

Furthermore, it is known that there are so many different benefits when it comes to sensory learning and sensory play. Sensory devices and applications bring an affordable and extremely effective learning tool that encourages children to learn through curiosity, creativity, and general problem-solving. Sensory applications help to build nerve connections in the adolescent brain, aid in language development skills, socializing skills, soothing environments, encourage the development of motor skills, encourage scientific thinking, enhance problem-solving skills, and other mindful activities which are beneficial to every child.

Finally, it is known that communication and language are crucial in a child's development. Introducing a set of toddlers to a sensory learning device helps toddlers to communicate through nonverbal cues while also developing and expanding their vocabulary with sensory concepts and descriptive adjectives. Using sensory devices, children of all ages start to develop cognitive skills by using multiple senses, such as sight and touch, to help to improve knowledge retention skills by engaging the whole brain. As children explore and manipulate objects through their sense of touch, this allows them to develop their gross motor skills by controlling their muscles and coordinating movements, thereby allowing the child to become more independent.

Therefore, this invention's purpose is to fulfill these and other needs in sensory learning and sensory play art in a manner more apparent to the skilled artisan once given the following disclosure.

The preferred sensory learning, sensory play pegboard display, according to various embodiments of the present invention, offers the following advantages: ease of use; portability; reduced cost; reduced weight; and the ability to provide sensory learning and sensory play. In many of the preferred embodiments, these advantages are optimized to the extent that is considerably higher than previously achieved in prior known sensory learning and sensory play devices.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is to describe particular embodiments only and is not intended to be limiting to the invention. As used herein, the term "and/or" includes any and all combinations of one or more of the associated listed items. As used herein, singular forms "a", "an", and "the" are intended to include the plural forms as well as the singular forms unless the context clearly indicates otherwise. It will be further understood that the terms "comprises" and/or "comprising," when used in this specification, specify the presence of stated features, steps, operations, elements, and/or components but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefits, and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new sensory learning, sensory play pegboard display technology, device, apparatus, and methods for making and using are discussed herein. In the following description, for purposes of explanation, numerous specific details are set forth to provide a thorough understanding of the present invention. It will be evident, however, to one skilled in the art that the present invention may be practiced without these specific details.

The present disclosure is considered an exemplification of the invention and is not intended to limit the invention to the specific embodiments illustrated by the figures or description below.

The present invention will now be described by referencing the appended figures representing preferred embodiments. FIGS. 1-18 are illustrations of a sensory learning, sensory play pegboard display (or an electronic, visual presentation device having a pegboard display).

Figures 1, 2:
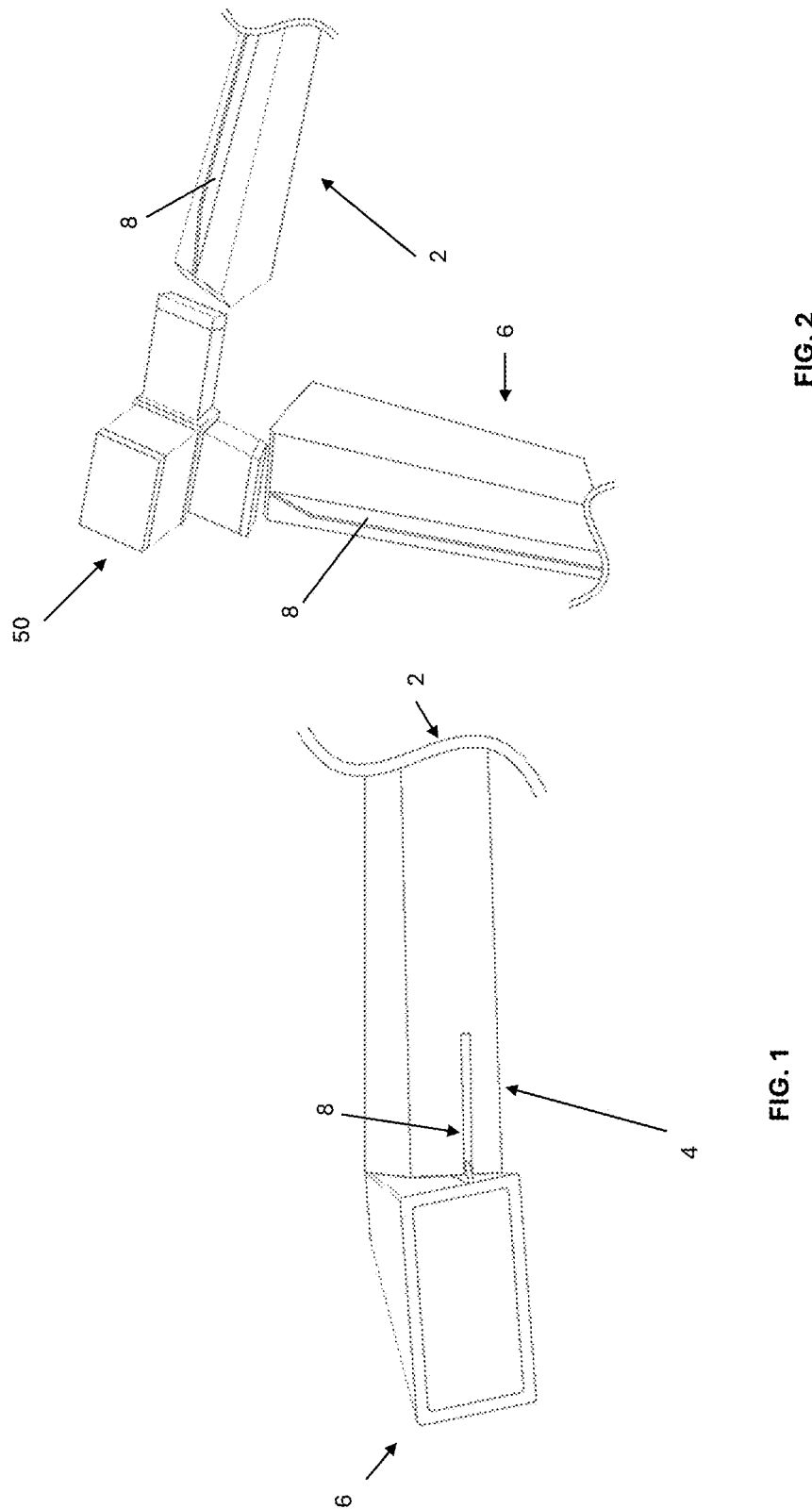
FIG. 1 is a schematic illustration of a section of a frame member being attached to another frame member for a sensory learning, sensory play pegboard display system, according to various embodiments of the present invention described herein.
FIG. 2 is a schematic illustration of the frame member being connected to another frame member through the use of 3-way connectors for the sensory learning, and sensory play pegboard display system, according to various embodiments of the present invention described herein.

In particular, as shown in FIG. 1, there are illustrated frame members 2 and 6, wherein frame members 2 and 6 each include a slot 4 and an extension 8, which will be discussed in greater detail later. In one embodiment, frame members 2 and 6 are constructed of any suitable, durable, high-strength, lightweight, rust-resistant, UV-resistant material such as anodized aluminum. Preferably, slot 4 and extension 8 are formed on frame members 2 and 6 by conventional forming techniques such as grinding, welding, forming or the like.

Figures 5, 6:
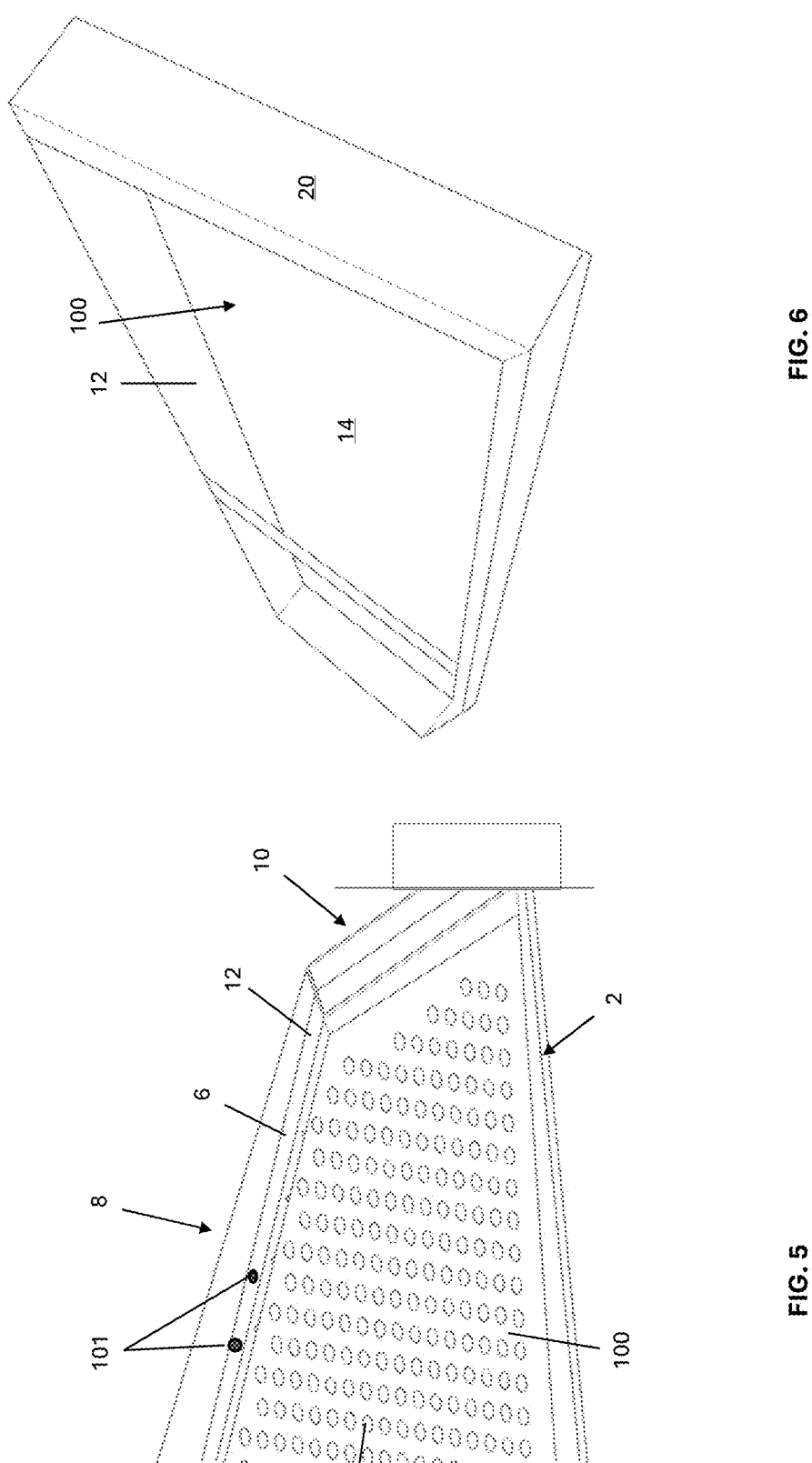
FIG. 5 is a partial schematic illustration of the constructed frame assembly before a white acrylic backing is placed on the back of the peg opening plate for the sensory learning, sensory play pegboard display system, according to various embodiments of the present invention described herein.
FIG. 6 is a schematic illustration of the white acrylic backing being attached to the back of the peg opening plate on the sensory learning, sensory play pegboard display system, according to various embodiments of the present invention described herein.

A unique aspect of the present invention is the use of slots 4 and extensions 8. As shown in FIG. 1, slots 4 and extensions 8 are constructed so that extensions 8 fit within slot 4. In this manner, slots 4 and extensions 8 can be used to more securely attach frame members 2 and 6 to each other. Also, when extensions 8 are securely located within slots 4, the frame members 2 and 6 should not move with respect to one another. It is to be understood that each frame member 2 and 6 includes a slot 4 located at each end of each of the frame members 2 and 6. Furthermore, extensions 8 are constructed to run along a length of each frame member 2 and 6 (FIGS. 2, 3, and 5).

Regarding FIG. 2, in one embodiment, connector 50 is used to connect frame member 2 to frame member 6. Preferably, connecter 50 is a 3-way connector. As shown in FIG. 2, connector 50 is to be attached to the end of each of the frame members 2 and 6. Also, it is to be understood that there is a plurality of connectors 50 that are used to connect two (2) frame members 2 to two (2) frame members 6 to form a rectangular frame assembly 20 (FIG. 4).

Figures 3, 4:
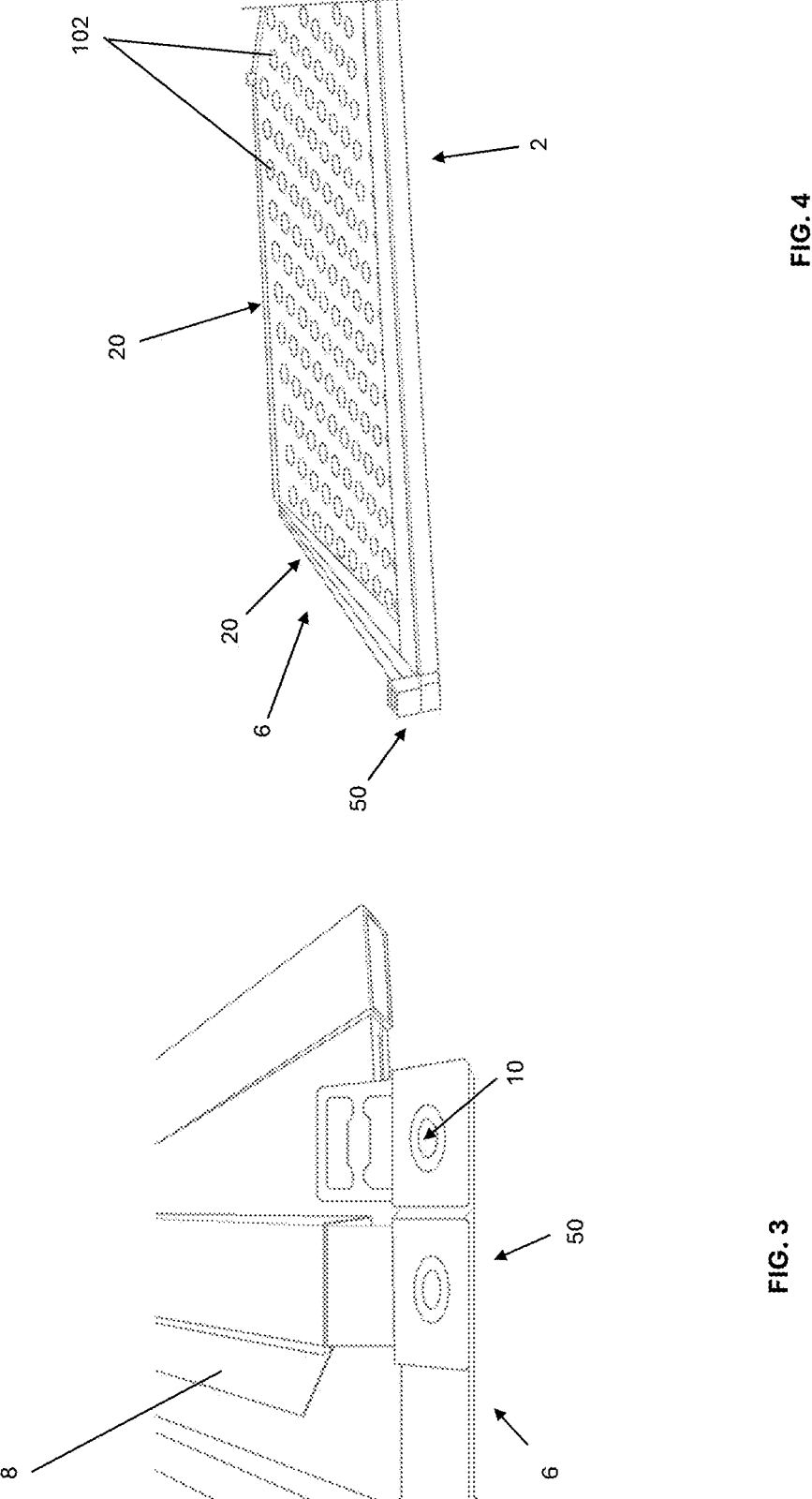
FIG. 3 is a schematic illustration of dismountable inserts attached to the frame member for use with a detachable base for the sensory learning, and sensory play pegboard display system, according to various embodiments of the present invention described herein.
FIG. 4 is a partial schematic illustration of the peg opening plate after the holes have been formed in the plate and the peg opening plate has been attached to the frame assembly for the sensory learning, sensory play pegboard display system, according to various embodiments of the present invention described herein.
Figures 12, 13:
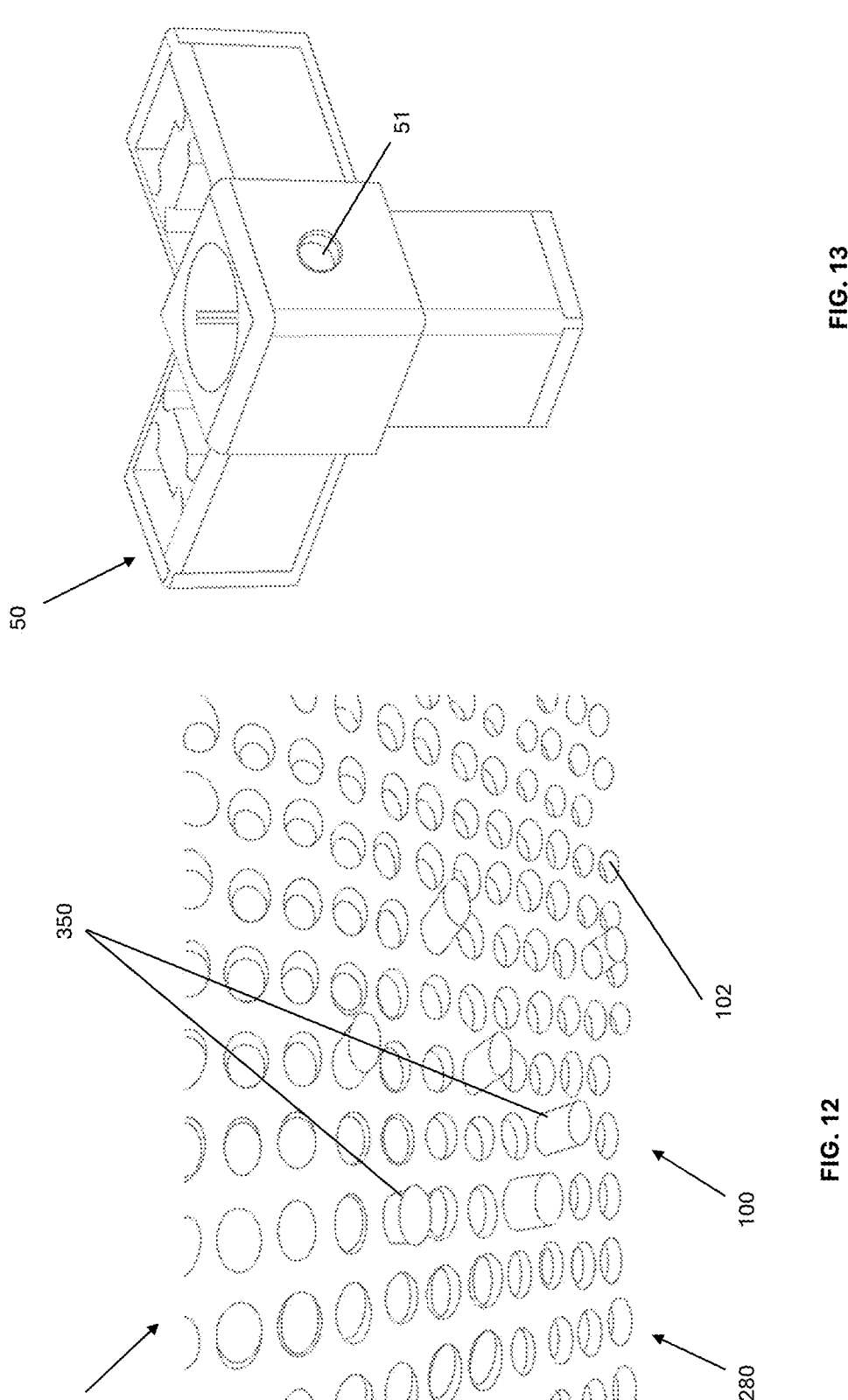
FIG. 12 is a schematic illustration of various pegs being located and illuminated in the sensory learning, sensory play pegboard display system, according to various embodiments of the present invention described herein.
FIG. 13 is a schematic illustration of a 3-way connector for use in the sensory learning, sensory play pegboard display system, according to various embodiments of the present invention described herein.
Figure 17:
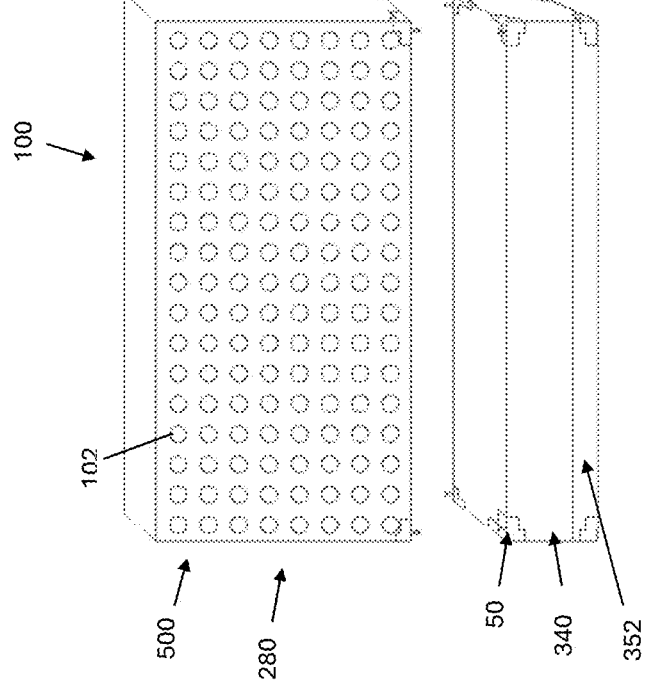
FIG. 17 is a schematic illustration showing the 3-way connector assembly that allows the display to be removably connected to the base of the sensory learning, sensory play pegboard display system, according to various embodiments of the present invention described herein.
Figure 18:
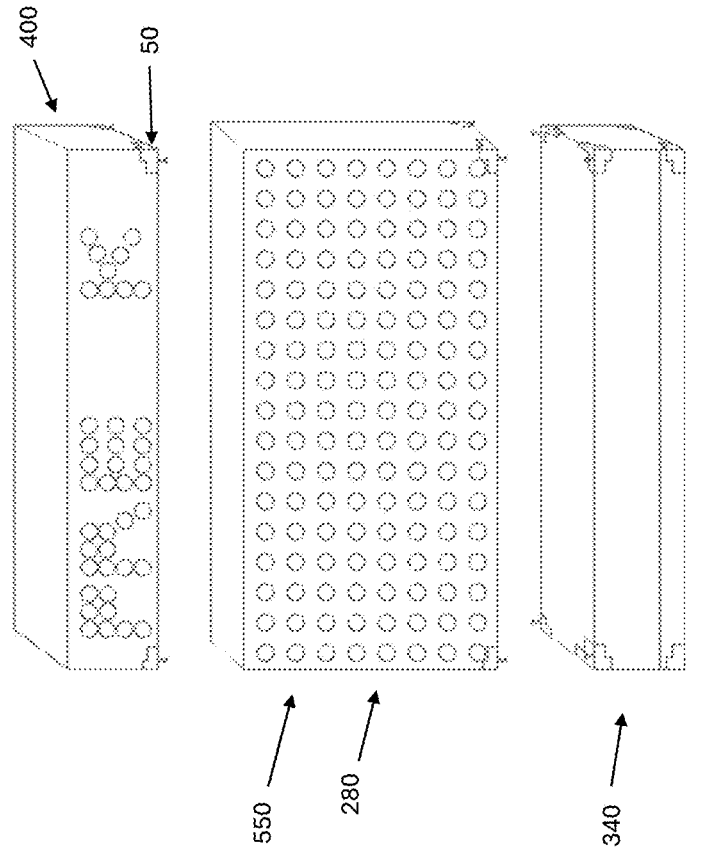
FIG. 18 is a schematic illustration showing the 3-way connector assembly that allows the display to be removably connected to a topper display of the sensory learning, sensory play pegboard display system, according to various embodiments of the present invention described herein.

With respect to FIG. 3, removable inserts 10 have been removably attached to a side of connecter 50 at opening 51 (FIG. 13). As will be discussed in greater detail later, inserts 10 will allow display 280 to be removably attached to the base assembly 340 (FIGS. 17 and 18).

Regarding FIG. 4, as discussed earlier, connectors 50 are used to connect two (2) frame members 2 and two (2) frame members 6 together in order to form frame assembly 20. Once frame assembly 20 has been constructed, peg opening plate 100 having peg openings 102 is located within and conventionally retained on frame assembly 20. In one embodiment, peg opening plate 100, preferably, is constructed of any suitable, durable, high-strength, lightweight, rust-resistant, UV-resistant material such as polyvinyl chloride (PVC). In another embodiment, openings 102 are conventionally formed in peg opening plate 100 by drilling, forming, grinding, routing, or the like.

As shown in FIG. 5, after the peg opening plate 100 has been installed onto frame assembly 20, frame walls 10 and 12 are attached to frame members 2 and 6 through the use of extensions 8. In particular, frame walls 10 and 12 are conventionally attached to extensions 8 through the use of conventional fasteners 101. A unique aspect of the present invention is the use of a strip 13 of material, preferably polyvinyl chloride (PVC) that is conventionally attached to the frame walls 10 and 12 and frame members 2 and 6 around the perimeter of the interior of the frame assembly 20. The strip 13 is used to provide a ledge or other similar supporting surface for the edges of backing 14 so that the backing 14 remains in place.

Regarding FIG. 6, after the frame walls 10 and 12 have been installed, the backing 14 is installed against the back of peg opening plate 100. As discussed above, the backing 14 is located adjacent to the strip 13. In one embodiment, preferably, backing 14 is constructed of any suitable, durable, high-strength, lightweight, rust-resistant, UV-resistant material such as a white, acrylic polymeric material.

A unique aspect of the present invention is that backing 14 is white, and backing 14 will allow the light emitted from the light assembly 150 (FIG. 9) to be more evenly dispersed across the back of the peg opening plate 100. In this manner, the pegs 350 (FIG. 12) will more evenly display their color when the pegs 350 are inserted into the peg opening plate 100, as will be discussed in greater detail later.

Figure 8:
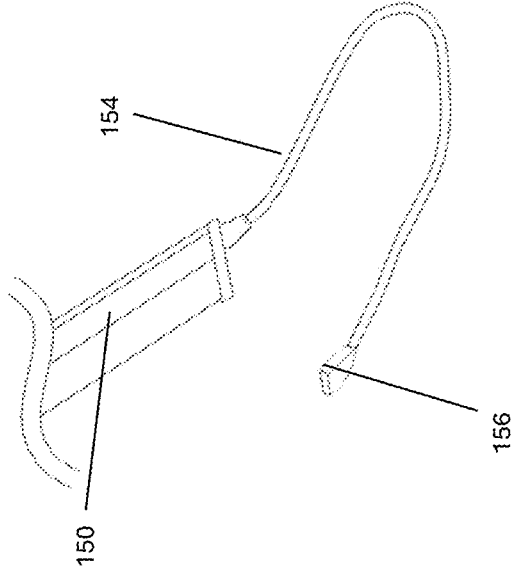
FIG. 8 is a schematic illustration of the electrical connectors used to connect the LED tube lights to each other and a power source for the sensory learning, and sensory play pegboard display system, according to various embodiments of the present invention described herein.
Figure 7:
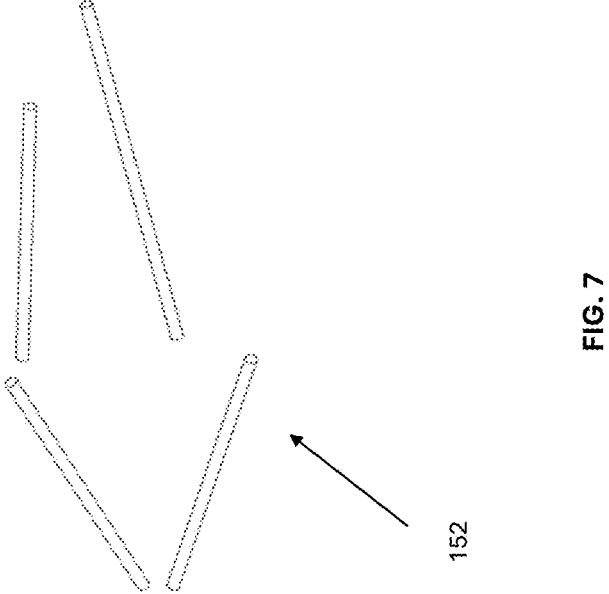
FIG. 7 is a schematic illustration of the light emitting diodes (LED) tube lights for use in the sensory learning and play pegboard display system, according to various embodiments of the present invention described herein.
Figure 9:
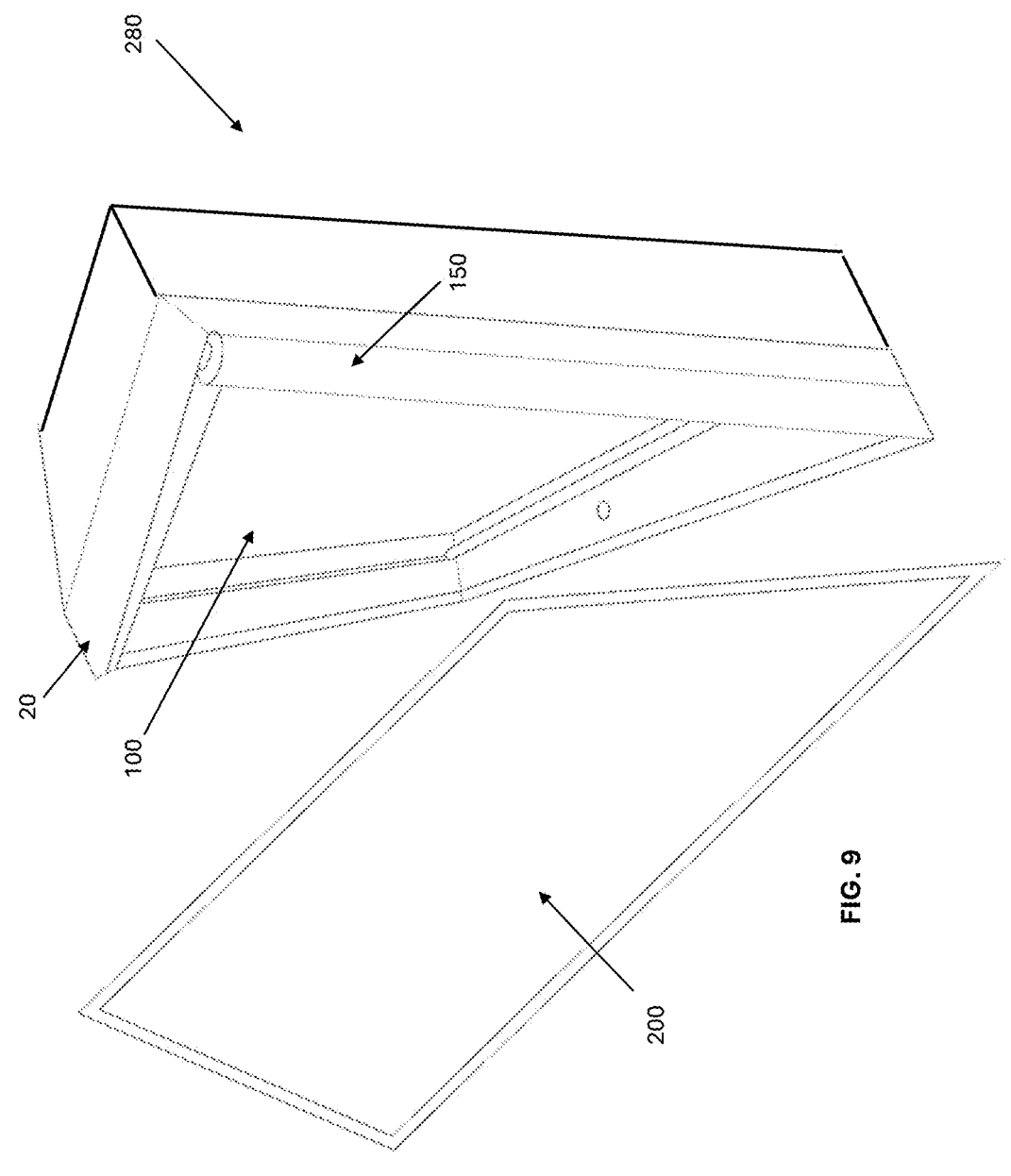
FIG. 9 is a schematic illustration of the back panel being removed from the sensory learning, sensory play pegboard display system, according to various embodiments of the present invention described herein.
Figure 11:
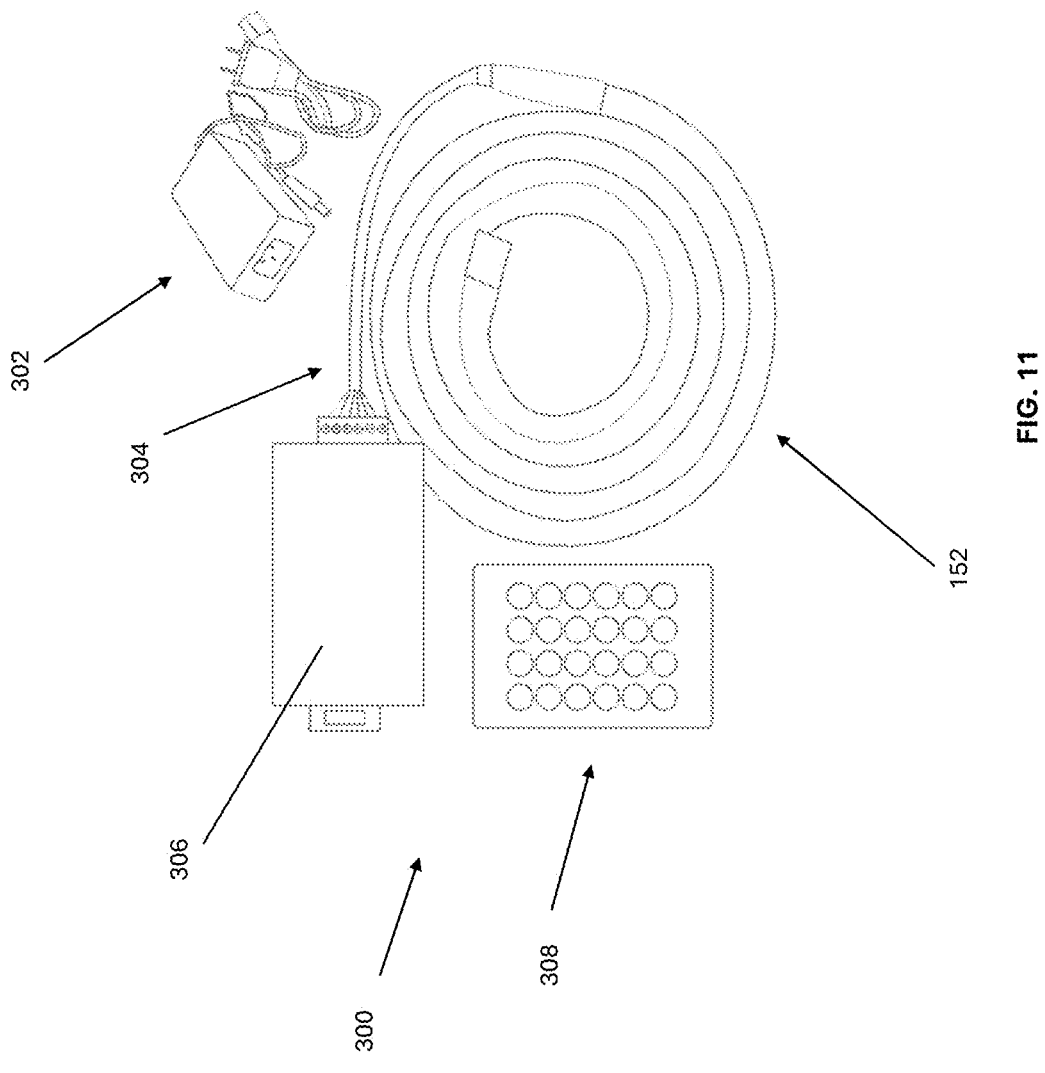
FIG. 11 is a schematic illustration of the power supply and the remote control for use with the LED tube lights for the sensory learning, and sensory play pegboard display system, according to various embodiments of the present invention described herein.

With respect to FIGS. 7-9, there is illustrated light assembly 150 which is installed inside of frame assembly 20 and frame walls 10 and 12 and adjacent to peg opening plate 100. In one embodiment, light assembly 150 includes, in part, tube lights 152, tube light cable 154, and tube light connecter 156. It is to be understood that a series of tube lights 152 can be connected together to form light assembly 150. For example, four (4) tube lights 152 can be connected together to form a rectangular light assembly 150. In this example, tube lights 152 can be connected through tube light cable 154 and tube light connecter 156 by inserting a tube light connector 156 from one tube light 152 into an opening (not shown) in another tube light 152. The last tube light 152 is then connected to the tube light control lead 304 (FIG. 11). As will be discussed in greater detail later, LED control assembly 300 can be used to control the operation of the light assembly 150.

Another unique aspect of the present invention is the removable display backing assembly 200. In this manner, if any tube lights 152 in tube light assembly 150 malfunctions or otherwise stops working, the removable display back assembly 200 can be quickly and easily removed so that the defective tube light 152 can be easily accessed, removed, and replaced. It is to be understood that backing assembly 200 is attached to frame assembly 20 through the use of conventional fasteners such as hook and loop fasteners (Velcro®), mechanical fasteners (screws, bolts, etc.) or the like.

Figure 10:
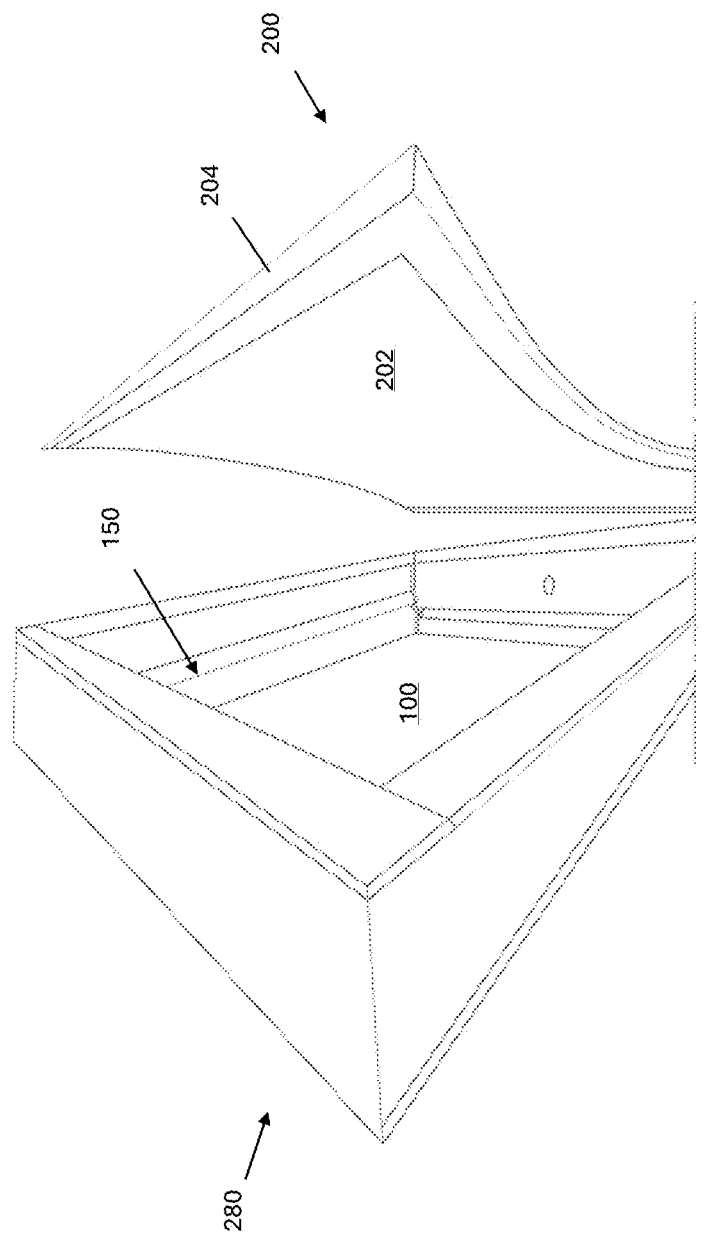
FIG. 10 is a schematic illustration of the location of the LED tube lights in the sensory learning, sensory play pegboard display system, according to various embodiments of the present invention described herein.

Regarding FIG. 10, in one embodiment, removable display backing assembly 200 includes, in part, back wall 202 and back wall covering 204. Preferably, back wall covering 204 is any suitable, durable, black covering that can be conventionally attached to back wall 202. An important feature of back wall covering 204 is that back wall covering 204 should be constructed and attached to be able to maintain a smooth, non-reflective surface on removable display backing assembly 200.

It is to be understood that a plurality of handle assemblies (not shown) can be attached to the frame walls 10 and 12 of frame assembly 20 by conventional fastening techniques. In this manner, once the handle assemblies have been attached to the frame walls 10 and 12 of frame assembly 20, the handle assemblies can be used to move the display 280, as will be discussed in greater detail later.

With respect to FIG. 11, LED control assembly 300 is illustrated. In one embodiment, LED control assembly 300 includes, in part, tube 152, power connector assembly 302, tube light electrical lead 304, LED controller 306, and light assembly remote controller 308. It is to be understood that while tube light 152 is shown as being flexible, tube light 152 in FIG. 11, tube light 152 can also be a conventional, straight, rigid tube light, as shown in FIG. 7. The important point being that LED control assembly 300 can be connected to any style of tube light 152 in order to control the operating characteristics of tube light 152.

Another unique aspect of the present invention is the use of LED control assembly 300. In particular, LED control assembly 300 can be used to change the operating characteristics of each tube light 152. For example, the LED control assembly 300 can control a color and/or brightness of each tube light 152. The LED control assembly 300 can also turn off and on various tube lights 152 and/or cause the tube lights to pulse or otherwise go off and on over a predetermined time period.

Once display 280 has been constructed, as shown in FIG. 12, pegs 350 can be placed in openings 102 to create various patterns and/or shapes. In this manner, display 280 can be used as a sensory learning, sensory play pegboard display, as will be discussed in greater detail later.

Another unique aspect of the present invention is the construction of pegs 350. Preferably, the pegs are constructed of any suitable polymeric material. In particular, pegs 350 are constructed of acrylic. However, another unique aspect of the present invention is that the pegs 350 can also be constructed of a deep pore epoxy resin, which includes a 2-part solution, one part casting resin, and one part hardener. In particular, when the two parts are mixed, they start to cure/dry. Another unique aspect of the present invention is that the resin can be dyed with transparent resin colorant and cured in a silicone mold to be the exact same diameter of the acrylic pegs. Furthermore, the color can be changed to provide different colors. In this manner, the use of the deep pore epoxy resin reduces the shipping weight of the display 280, reduces the cost of the display 280, and makes the display 280 lighter while having a much better impact strength than cast acrylic.

Regarding FIG. 13, there is illustrated an embodiment of a 3-way connector 50. In particular, the 3-way connector 50 should be constructed to be able to connect the frame members 2 and 6 together and also be able to connect display 280 to base assembly 340 (FIG. 17) and topper display assembly 400 (FIG. 18), as will be discussed in greater detail later.

Figure 14:
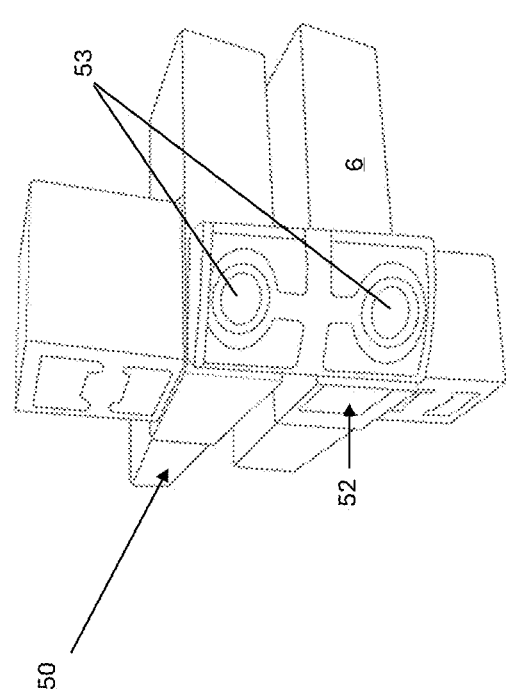
FIG. 14 is a schematic illustration of the 3-way connector having a barrel insert attached to the frame member for the sensory learning, sensory play pegboard display system which allows the barrel insert to be detached from the connector or the frame member for the sensory learning, sensory play pegboard display system, according to various embodiments of the present invention described herein.

A still another unique aspect of the present invention is the use of barrel insert 52 having buttons 53. As shown in FIG. 14, barrel insert 52 can be used in connection with connector 50 to allow the barrel insert 52 to be detached from connector 50 and/or the display 280 through the use of buttons 53. In this manner, barrel insert 52 can be attached to opening 51 (FIG. 13) in connector 50 so that buttons 53 can be used. In particular, the barrel insert 52 includes two (2) fasteners (buttons 53) on each side which allow for the connection of multiple connectors 50. The user can detach a connector 50 from a frame member 2 or 6 from the item by simply pushing the buttons 53. After the buttons 53 have been pushed, the user can then remove the frame 2 or 6 from the connector 50. Conversely, in order to attach the frame member 2 or 6 to a connector 50, the user simply slides the frame member 2 or 6 over the connector 50 and the buttons 53 will lock in place on the frame member. (Please note that optionally, frame members 2 and 6 and connector 50 of FIG. 2 can implement buttons 53 and holes 51 to lock them in place.)

Figures 15, 16:
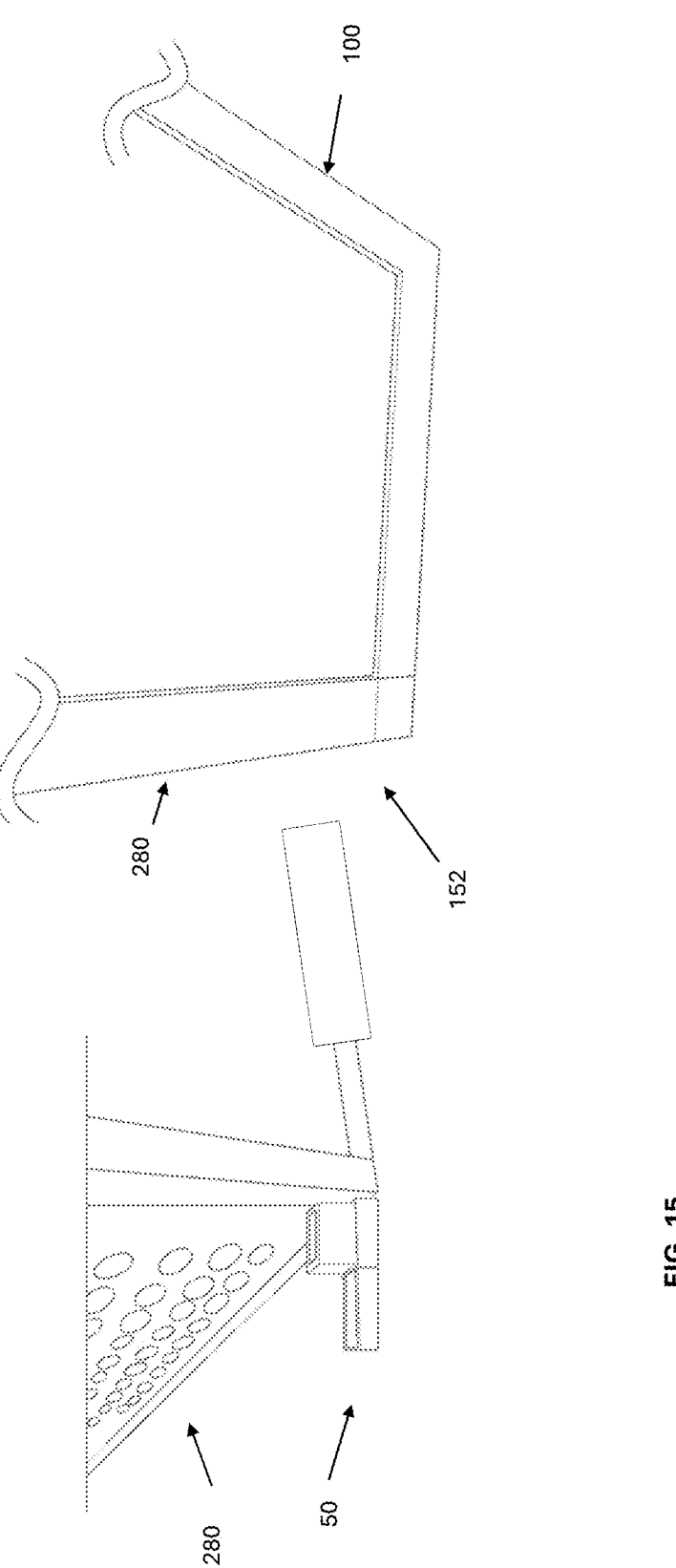
FIG. 15 is a schematic illustration of a 3-way connector being connected to a base for the sensory learning, sensory play pegboard display system, according to various embodiments of the present invention described herein.
FIG. 16 is a schematic illustration of a bottom of the display structure prior to being connected to the base showing where the barrel inserts will be inserted to allow the display to be disconnected from the base for the sensory learning, sensory play pegboard display system, according to various embodiments of the present invention described herein.

Regarding FIG. 15, there is illustrated another illustration of the 3-way connector 50 being attached to display 280. In this manner, connector 50 will allow display 280 to be securely attached to another display 280, a base assembly 340 (FIG. 17), and/or a topper display assembly 400 (FIG. 18).

With respect to FIG. 16, there is illustrated the a back view towards the bottom of the display 280 prior to being connected to a base assembly 340 such that the barrel inserts 52 (not shown) will be inserted into the bottom of the display 280 so that the display 280 can be easily and quickly disconnected from the base assembly 340.

Regarding FIG. 17, FIG. 17 illustrates the use of connectors 50 for removably connecting the display 280 to the base assembly 340. In one embodiment, the base assembly includes base walls 352 that are connected together using connectors 50. As shown in FIG. 17, connectors 50 allow display 280 to be removably connected to base assembly 340. Furthermore, it is to be understood that once display 280 is connected to base assembly 340, sensory learning, sensory play pegboard display 500 is constructed. It is to be understood that after the display 280 is removed, the base assembly 340 can be easily and quickly taken apart for transportation. For that matter, the use of connector 50 allows the frame assembly 20 (FIG. 4) of the display 280 to also be easily and quickly taken apart.

Another unique aspect of the present invention is the use of topper display assembly 400 (FIG. 18). In one embodiment, topper display assembly 400 can be used to display a logo or other identifying information related to the design being shown on display 280. In particular, topper display assembly 400 can also be constructed similarly to display 280 in that topper display assembly 400 can include a frame structure, a light assembly, and a peg opening plate that will allow pegs to be inserted into openings in the peg opening plate in the topper display assembly 400 to display a design on the topper display assembly 400.

As shown in FIG. 18, connectors 50 allow display 280 to be removably connected to base assembly 340. Also, connectors 50 allow topper display assembly 400 to be removably connected to display 280. Furthermore, it is to be understood that once display 280 is connected to base assembly 340 and topper display assembly 400, sensory learning, sensory play pegboard display 550 is constructed.

Finally, it is to be understood that a conventional display mounting assembly (not shown) such as a video bracket or other device can be used to secure display 280 (not shown) to a wall or other similar structural surface. In this manner, if it is desired to secure the display 280 to a wall or other similar surface instead of using the base assembly 340, the display 280 can be conventionally attached to the display mounting assembly. It is to be further understood that the topper display assembly 400 could be attached to the display 280 while the display 280 is retained by the display mounting assembly.

Another unique aspect of the present invention is that the display 280 or the sensory learning sensory play pegboard displays 500/550 are useful for sensory learning applications. The display 280 or the sensory learning, sensory play pegboard displays 500/550 can also be used in the treatment of sensory processing disorder (SPD), attention-deficit/hyperactivity disorder (ADHD), dyslexia, autism, patients suffering from brain damage or memory loss because the display 280 or the sensory learning, sensory play pegboard displays 500/550 can assist in developing fine gross motor skills, eye coordination, memory retention therapy, and cognitive hand dexterity. This is because display 280 or the sensory learning, sensory play pegboard displays 500/550 help develop these skills using sensory stimulation, fine gross motor skills, hand dexterity, cognitive functions, and thinking.

Also, the present invention provides an affordable and extremely effective learning tool that encourages an individual to learn through curiosity, creativity, and general problem-solving. Sensory applications help to build nerve connections in the adolescent brain, aid in language development skills, socializing skills, soothing environments, encourage the development of motor skills, encourage scientific thinking, enhance problem-solving skills, and other mindful activities which are beneficial to everyone.

As discussed above, it is known that communication and language are crucial in a child's development. Introducing a set of toddlers to a sensory learning device such as the present invention helps toddlers to communicate through nonverbal cues while also developing and expanding their vocabulary with sensory concepts and descriptive adjectives. Using sensory devices such as the present invention, children of all ages start to develop cognitive skills by using multiple senses, such as sight and touch, to help to improve knowledge retention skills by engaging the whole brain. As children explore and manipulate objects through their sense of touch, the present invention allows them to develop their gross motor skills by controlling their muscles and coordinating movements, allowing the child to become more independent.

Another unique aspect of the present invention is the reduction in weight of the display 280 or the sensory learning, sensory play pegboard displays 500/550. In particular, the display 280 or the sensory learning, sensory play pegboard displays 500/550 utilize frame members 2 and 6, backing 14, and light back wall covering 204, constructed of lightweight materials.

A further unique aspect of the present invention is the use of removable display backing assembly 200. As discussed above, if any of the tube lights 152 in tube light assembly 150 malfunctions or otherwise stops working, the removable display back assembly 200 can be quickly and easily removed so that the defective tube light 152 can be removed and replaced.

Finally, another unique aspect of the present invention is the number of openings 102. In particular, in one embodiment, the present invention provides more openings 102 than prior known displays. For example, a 4-foot by 8-foot version of the present invention will include 1800 openings 102.

While it has not been mentioned, one familiar with the art would realize that the device is not limited by the materials used to create each apparatus that comprises the invention. Any other material type can comprise some or all of the elements in achieving high-frequency and high-power modulation for laser devices and apparatuses in various embodiments of the present invention.

Although the present invention has been illustrated and described herein with reference to preferred embodiments and specific examples, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A sensory learning, sensory play pegboard display, comprising:
   a plurality of frame members;
   a plurality of connectors, wherein each of the plurality of connectors is used to connect each of the plurality of frame members together in order to form a frame assembly;
   a plurality of frame walls, wherein each of the plurality of frame walls is operatively connected to one of the plurality of frame members;
   a peg opening plate located adjacent to the frame assembly, wherein the peg opening plate includes a plurality of openings;
   a plurality of pegs, wherein each of the plurality of pegs is capable of being retained within one of the plurality of openings;
   a light assembly operatively connected to the plurality of walls and located adjacent to the peg opening plate; and
   a display backing assembly removably connected to the plurality of walls.

2. The display, according to claim 1, wherein the display further comprises:

a base assembly, wherein the base assembly is removably connected to the display.

3. The display, according to claim 1, wherein the display further comprises:
   a topper display assembly, wherein the topper display assembly is removably connected to the display.

4. The display, according to claim 1, wherein each of the frame members further comprises:
   an extension located along a length of each of the frame members; and
   a slot located at each end of each of the frame members.

5. The display, according to claim 1, wherein the display further comprises:
   a white backing located between the peg opening plate and the light assembly.

6. The display, according to claim 1, wherein the light assembly further comprises:
   at least one tube light;
   a tube light cable operatively connected to the at least one tube light;
   a tube light connecter operatively connected to one end of the tube light cable; and
   a LED control assembly electrically connected to the at least one tube light.

7. The display, according to claim 1, wherein the display backing assembly further comprises:
   a back wall; and
   a back wall covering located adjacent to one side of the back wall.

8. A method of constructing a sensory learning, sensory play pegboard display, comprising:
   providing a plurality of frame members;
   providing a plurality of connectors, wherein each of the plurality of connectors is used to connect each of the plurality of frame members together in order to form a frame assembly;
   providing a plurality of frame walls, wherein each of the plurality of frame walls is operatively connected to one of the plurality of frame members;
   attaching a peg opening plate adjacent to the frame assembly, wherein the peg opening plate includes a plurality of openings;
   providing a plurality of pegs, wherein each of the plurality of pegs is capable of being retained within one of the plurality of openings;
   attaching a light assembly to the plurality of walls, wherein the light assembly is located adjacent to the peg opening plate; and
   removably connecting a display backing assembly to the plurality of walls.

9. The method, according to claim 8, wherein the method further comprises:
   providing a base assembly, wherein the base assembly is removably connected to the display.

10. The method, according to claim 8, wherein the method further comprises:
   providing a topper display assembly, wherein the topper display assembly is removably connected to the display.

11. The method, according to claim 8, wherein each of the frame members further comprises:
   an extension located along a length of each of the frame members; and
   a slot located at each end of each of the frame members.

12. The method, according to claim 8, wherein the method further comprises:

attaching a white backing between the peg opening plate and the light assembly.

13. The method, according to claim 8, wherein the step of attaching a light assembly further comprises:

providing at least one tube light;

attaching a tube light cable to the at least one tube light;

attaching a tube light connecter to one end of the tube light cable; and attaching a LED control assembly to the at least one tube light.

14. The method, according to claim 8, wherein the step of removably connecting a display backing assembly further comprises:

providing a back wall; and attaching a back wall covering adjacent to one side of the back wall.

15. An electronic, visual presentation device having a pegboard display, comprising:

a plurality of frame members;

a plurality of connectors, wherein each of the plurality of connectors is used to connect each of the plurality of frame members together in order to form a frame assembly;

a plurality of frame walls, wherein each of the plurality of frame walls is operatively connected to one of the plurality of frame members;

a peg opening plate located adjacent to the frame assembly, wherein the peg opening plate includes a plurality of openings;

a plurality of pegs, wherein each of the plurality of pegs is capable of being retained within one of the plurality of openings;

a light assembly operatively connected to the plurality of walls and located adjacent to the peg opening plate; and a display backing assembly removably connected to the plurality of walls.

16. The device, according to claim 15, wherein the device further comprises:

a base assembly, wherein the base assembly is removably connected to the display.

17. The device, according to claim 15, wherein the device further comprises:

a topper display assembly, wherein the topper display assembly is removably connected to the display.

18. The device, according to claim 15, wherein each of the frame members further comprises:

an extension located along a length of each of the frame members; and a slot located at each end of each of the frame members.

19. The device, according to claim 15, wherein the device further comprises:

a white backing located between the peg opening plate and the light assembly.

20. The device, according to claim 15, wherein the light assembly further comprises:

at least one tube light;

a tube light cable operatively connected to the at least one tube light;

a tube light connecter operatively connected to one end of the tube light cable; and a LED control assembly electrically connected to the at least one tube light.

* * * * *